US012618700B2

(12) United States Patent
Ren et al.

(10) Patent No.: US 12,618,700 B2
(45) Date of Patent: May 5, 2026

(54) ANTI-INTERFERENCE STRUCTURE FOR ULTRASONIC GAS METER

(71) Applicant: ZENNER METERING TECHNOLOGY (SHANGHAI) LTD., Shanghai (CN)

(72) Inventors: Haijun Ren, Shanghai (CN); Shihua Li, Shanghai (CN); Ronghua Xu, Shanghai (CN); Wenjun Wang, Shanghai (CN)

(73) Assignee: ZENNER METERING TECHNOLOGY (SHANGHAI) LTD., Shanghai (CN)

( * ) Notice: Subject to any disclaimer, the term of this patent is extended or adjusted under 35 U.S.C. 154(b) by 291 days.

(21) Appl. No.: 18/540,897

(22) Filed: Dec. 15, 2023

(65) Prior Publication Data

US 2025/0085146 A1     Mar. 13, 2025

(30) Foreign Application Priority Data

Sep. 11, 2023     (CN) .......................... 202311161569.1

(51) Int. Cl.
 *G01F 1/66*      (2022.01)
 *G01F 1/667*     (2022.01)
(52) U.S. Cl.
 CPC .............. *G01F 1/662* (2013.01); *G01F 1/667* (2013.01)
(58) Field of Classification Search
 CPC ........... G01F 1/662; G01F 1/667; G01F 15/14
 See application file for complete search history.

(56) References Cited

U.S. PATENT DOCUMENTS

2021/0322008 A1* 10/2021 Xu ................... A61B 17/07207

FOREIGN PATENT DOCUMENTS

| CN | 112880760 | A | * | 6/2021 | ............. | G01F 1/662 |
| CN | 113188618 | A | * | 7/2021 | ............. | G01F 1/667 |
| CN | 113466665 | A | * | 10/2021 | ............. | G01R 31/28 |
| CN | 114577284 | A | * | 6/2022 | ............. | G01F 1/662 |

* cited by examiner

*Primary Examiner* — Kristina M Deherrera
*Assistant Examiner* — Gedeon M Kidanu
(74) *Attorney, Agent, or Firm* — Bayramoglu Law Offices LLC

(57)     ABSTRACT

An anti-interference structure for an ultrasonic gas meter includes an upper housing and a lower housing. A gas flow channel is fixedly provided in the upper housing. A side of the gas flow channel is fixedly provided with a control box. According to the anti-interference structure for the ultrasonic gas meter, in practical work, gas can enter the gas flow channel, and a signal sensor inside the gas flow channel can detect external signals. When a signal is detected, a motor is started to drive a bidirectional threaded rod to rotate. Thus, two sealing elements are driven to move in opposite directions so as to isolate the flowing gas and prevent it from continuing to flow. Then, the signal sensor sends a signal to notify personnel of inspection. A shielding layer can effectively isolate the external signal, thereby preventing the measurement accuracy from being affected by the external signal.

7 Claims, 7 Drawing Sheets

506

505

5

ANTI-INTERFERENCE STRUCTURE FOR ULTRASONIC GAS METER

CROSS REFERENCE TO THE RELATED APPLICATIONS

This application is based upon and claims priority to Chinese Patent Application No. 202311161569.1, filed on Sep. 11, 2023, the entire contents of which are incorporated herein by reference.

TECHNICAL FIELD

The present disclosure relates to the technical field of gas meters, and in particular to an anti-interference structure for an ultrasonic gas meter.

BACKGROUND

Ultrasonic gas meter is a new type of gas meter that is different from traditional mechanical gas meter and electronic gas meter. The working principle of the ultrasonic gas meter is as follows: according to a time difference method, the ultrasonic gas meter measures the gas flow velocity based on a difference in the propagation velocities of forward and backward ultrasonic signals in the gas. The time difference method has high accuracy and is widely used due to the fact that the velocity of sound is less affected by the error caused by changes in the fluid temperature.

Chinese Patent Application 201920995825.X provides an ultrasonic gas meter. The ultrasonic gas meter includes a gas meter casing. An inner chamber of the gas meter casing is fixedly provided with a gas passing detection tube. A left side of the gas meter casing is fixedly provided with a gas inlet, and a right side of the gas meter casing is fixedly provided with a gas outlet. The gas inlet penetrates a side wall of the gas meter casing and is fixedly connected to a left end of the gas passing detection tube. The ultrasonic gas meter is provided with a duplicate power supply to ensure power supply stability. However, due to the lack of an anti-interference structure, the aforementioned ultrasonic gas meter is subject to interference from medium- and low-frequency signals during use. As a result, the normal operation of ultrasonic waves is affected, thereby affecting the measurement accuracy and making it hard for the ultrasonic gas meter to work properly. In order to solve the problem, the present disclosure proposes an anti-interference structure for an ultrasonic gas meter.

SUMMARY

A major objective of the present disclosure is to provide an anti-interference structure for an ultrasonic gas meter, to effectively solve the problem that medium- and low-frequency signals interfere with the normal operation of ultrasonic waves, thereby affecting the measurement accuracy and making it hard for the ultrasonic gas meter to work properly.

To achieve the above objective, the present disclosure adopts the following technical solution:

An anti-interference structure for an ultrasonic gas meter includes an upper housing and a lower housing, where a gas flow channel is fixedly provided in the upper housing; a side of the gas flow channel is fixedly provided with a control box; a side of an outer surface of the gas flow channel is fixedly provided with a shielding layer; and a side of an interior of the gas flow channel is fixedly provided with a signal sensor.

Preferably, one side of an interior of the control box is movably provided with a bidirectional threaded rod, and the other side of the interior of the control box is fixedly provided with a sliding rod; two sides of an outer surface of the bidirectional threaded rod are respectively movably connected to two sealing elements, and the two sealing elements are movably connected to the sliding rod; a side of an outer surface of the control box is fixedly provided with a motor; and an output end of the motor is fixedly connected to the bidirectional threaded rod.

Preferably, the outer surface of the bidirectional threaded rod is provided with two opposite threaded grooves.

Preferably, a side of an interior of the control box is provided with a driving groove; a bearing is fixedly provided in the driving groove; and the bidirectional threaded rod is fixedly connected to the bearing.

Preferably, a side of each of the two sealing elements is fixedly provided with a sealing layer; and a side of one sealing element of the two sealing elements is fixedly provided with a connecting element, and a side of the other sealing element is provided with a connecting groove.

Preferably, the upper housing includes a fixing plate; a bottom surface of the upper housing is fixedly provided with a fixing element; a top surface of the lower housing is provided with a fixed groove; a side of the fixing plate is movably connected to a plurality of connecting bolts; and two sides of each of the upper housing and the lower housing are respectively provided with a plurality of connecting holes.

Preferably, a sound insulation layer is fixedly provided in each of the upper housing and the lower housing.

Preferably, a side of an outer surface of the upper housing is fixedly provided with a display screen.

Compared with the prior art, the present disclosure has the following beneficial effects:

The present disclosure provides an anti-interference structure for an ultrasonic gas meter. The anti-interference structure is provided with the control box. In practical work, the gas can enter the gas flow channel, and the signal sensor inside the gas flow channel can detect external signals. When a signal is detected, the motor is started through an internal program to drive the bidirectional threaded rod to rotate. As the bidirectional threaded rod rotates, the two sealing elements move in opposite directions to isolate the flowing gas and prevent it from continuing to flow. Then, the signal sensor sends a signal to notify the personnel of inspection. The shielding layer can effectively isolate the external signal, thereby preventing the measurement accuracy from being affected by the external signal.

Figure 1:
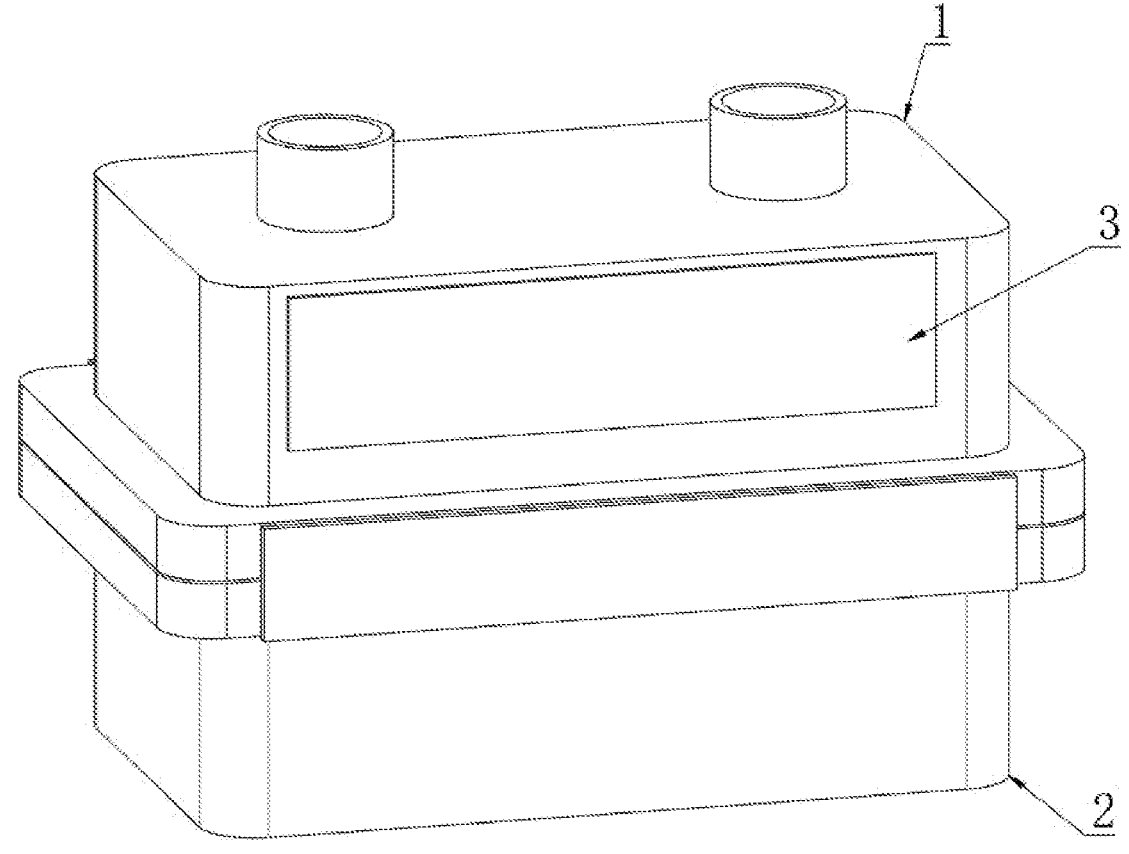
FIG. 1 is an overall structural diagram of an anti-interference structure for an ultrasonic gas meter according to the present disclosure.

Reference Numerals: 1. upper housing; 2. lower housing; 3. display screen; 4. gas flow channel; 5. control box; 6. shielding layer; 7. signal sensor; 501. bidirectional threaded rod; 502. sliding rod; 503. sealing element; 504. motor; 505. driving groove; 506. bearing; 5031. connecting element; 5032. connecting groove; 5033. sealing layer; 101. fixing element; 102. fixed groove; 103. fixing plate; 104. connecting bolt; 105. connecting hole; and 201. sound insulation layer.

DETAILED DESCRIPTION OF THE EMBODIMENTS

In order to make the technical means, creative features, objectives, and effects of the present disclosure easily understood, the present disclosure is further described below in combination with the specific implementations.

The present disclosure provides an anti-interference structure for an ultrasonic gas meter. As shown in FIG. 1, the anti-interference structure includes upper housing 1 and lower housing 2. Personnel can separate the upper housing 1 from the lower housing 2 to inspect and repair the internal structure of the anti-interference structure.

Gas flow channel 4 is fixedly provided in the upper housing 1. A side of the gas flow channel 4 is fixedly provided with control box 5. The control box 5 facilitates blocking gas in the gas flow channel 4, effectively and quickly preventing the gas from continuing to flow in the event of external signal interference.

A side of an outer surface of the gas flow channel 4 is fixedly provided with shielding layer 6. The shielding layer 6 is a prior art and that can effectively shield external signal interference. Signal sensor 7 is fixedly provided at one side of an interior of of the gas flow channel 4. The signal sensor 7 is a prior art and can detect external signals. When a signal is detected, the control box 5 blocks the transmitted gas to prevent it from continuing to flow. Besides, the control box can transmit a signal to an external device to inform the personnel of inspection.

It should be noted that a side of the outer surface of the upper housing 1 is fixedly provided with display screen 3 to facilitate real-time observation of the gas by a user.

Figure 2:
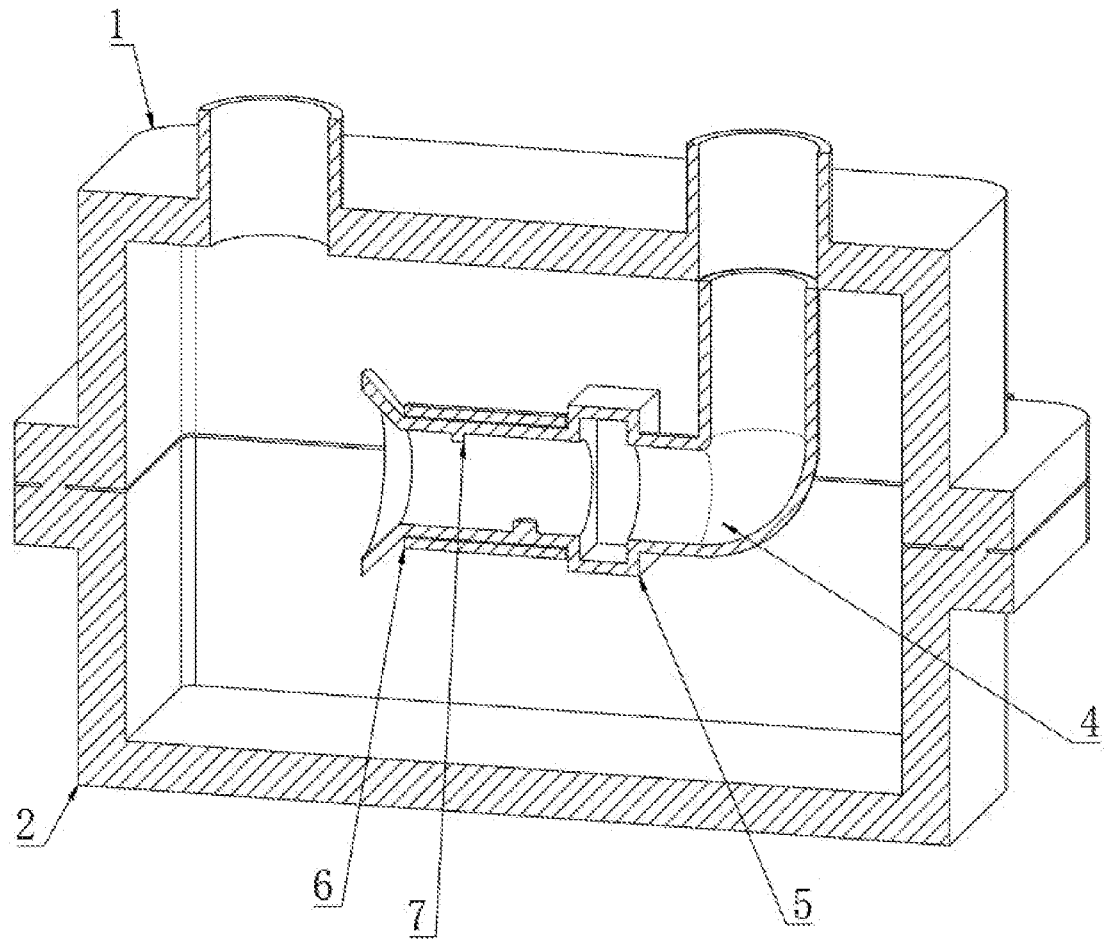
FIG. 2 is a section view of a gas flow channel according to the present disclosure.

As shown in FIG. 2, one side of an interior of the control box 5 is movably provided with bidirectional threaded rod 501, and the other side of the interior of the control box 5 is fixedly provided with sliding rod 502. Two sides of an outer surface of the bidirectional threaded rod 501 are respectively movably connected to two sealing elements 503, and the two sealing elements 503 are movably connected to the sliding rod 502. When the bidirectional threaded rod 501 rotates, it drives the two sealing elements 503 to move.

A side of an outer surface of the control box 5 is fixedly provided with motor 504. An output end of the motor 504 is fixedly connected to the bidirectional threaded rod 501. The motor 504 drives the bidirectional threaded rod 501 to rotate.

It should be noted that the outer surface of the bidirectional threaded rod 501 is provided with two opposite threaded grooves. When the motor 504 drives the bidirectional threaded rod 501 to rotate, it drives two sealing elements 503 to move in opposite directions so as to prevent gas from continuing to flow, facilitating subsequent inspection by personnel.

Figure 3:
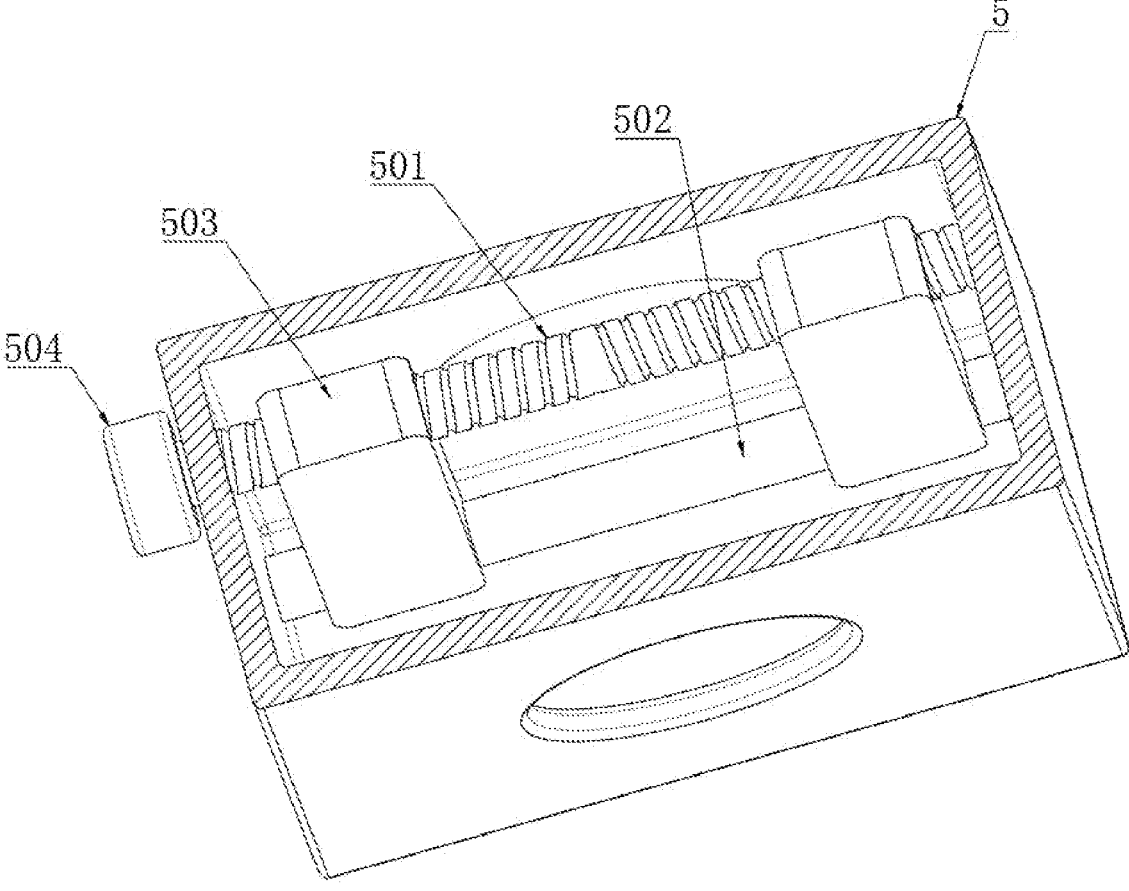
FIG. 3 is a section view of a control box according to the present disclosure.

As shown in FIG. 3, a side of an interior of the control box 5 is provided with driving groove 505. Bearing 506 is fixedly provided in the driving groove 505. The bidirectional threaded rod 501 is fixedly connected to the bearing 506.

Figure 4:
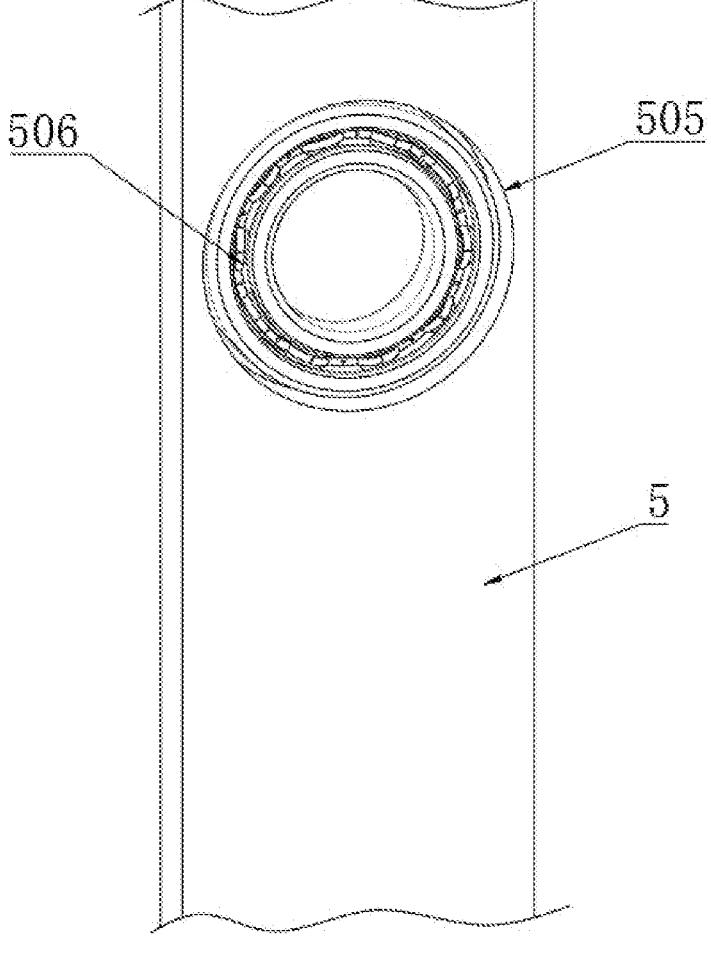
FIG. 4 is a structural diagram of the control box according to the present disclosure.

As shown in FIG. 4, a side of each of the two sealing elements 503 is fixedly provided with sealing layer 5033. The sealing layer 5033 seals an opening at a side of the control box 5. A side of one sealing element 503 of the two sealing elements 503 is fixedly provided with connecting element 5031, and a side of the other sealing element 503 is provided with connecting groove 5032. When the bidirectional threaded rod 501 rotates and drives the two sealing elements 503 to move in opposite directions, the connecting element 5031 is inserted into the connecting groove 5032 to seal the opening at the side of the control box 5, thereby preventing the continued flow of the gas.

Figure 5:
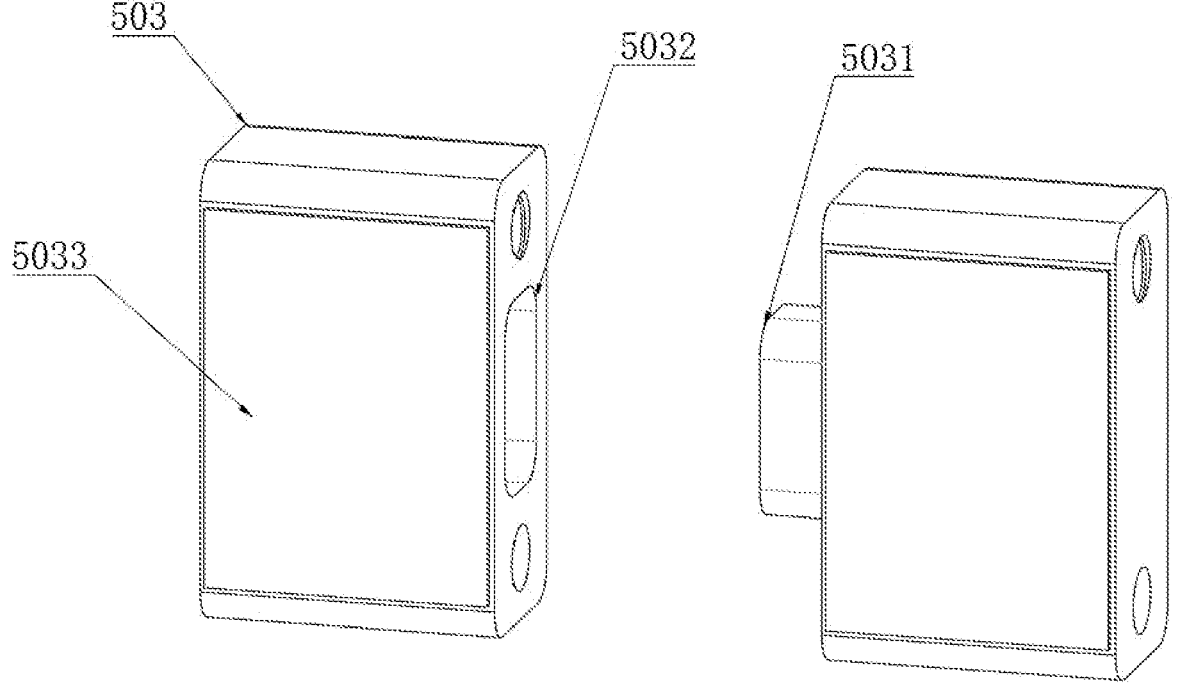
FIG. 5 is a structural diagram of sealing elements according to the present disclosure.

As shown in FIG. 5, the upper housing 1 includes fixing plate 103. A bottom surface of the upper housing 1 is fixedly provided with fixing element 101. A top surface of the lower housing 2 is provided with fixed groove 102. The fixing element 101 is inserted into the fixed groove 102. A side of the fixing plate 103 is movably connected to a plurality of connecting bolts 104. Two sides of each of the upper housing 1 and the lower housing 2 are respectively provided with a plurality of connecting holes 105. When the fixing element 101 is inserted into the fixed groove 102, the a plurality of connecting bolts 104 are rotated and inserted into the connecting holes 105 of the upper housing 1 and the lower housing 2, thereby connecting the upper housing 1 and the lower housing 2. The upper housing 1 and the lower housing 2 can be separated by personnel to inspect the internal structure.

Figure 6:
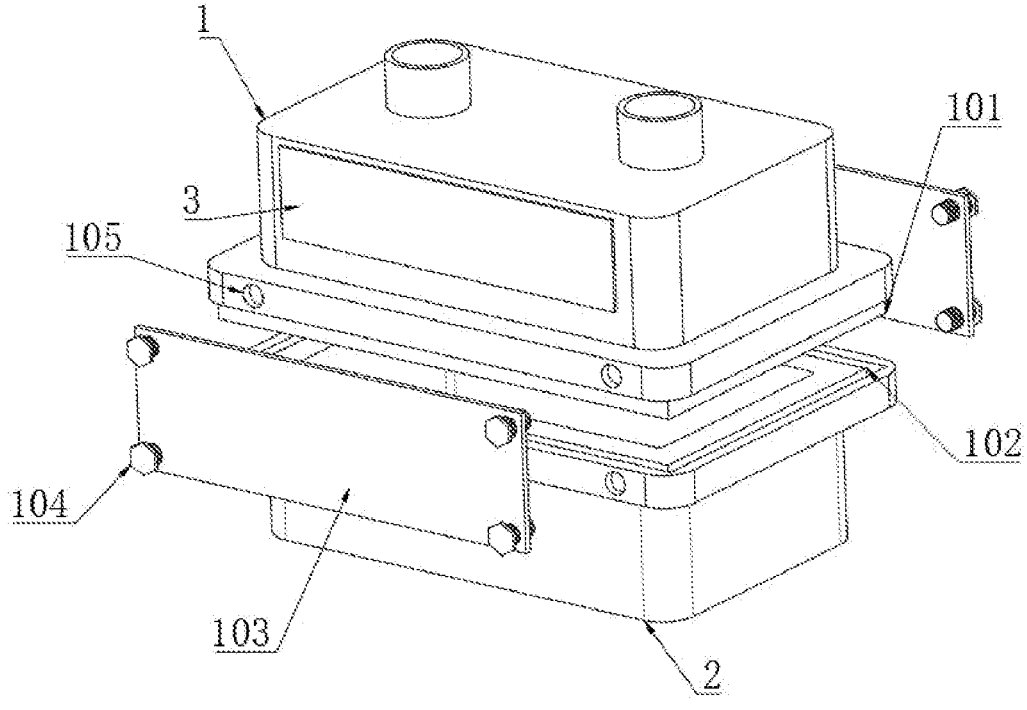
FIG. 6 is a schematic diagram an upper housing according to the present disclosure.
Figure 7:
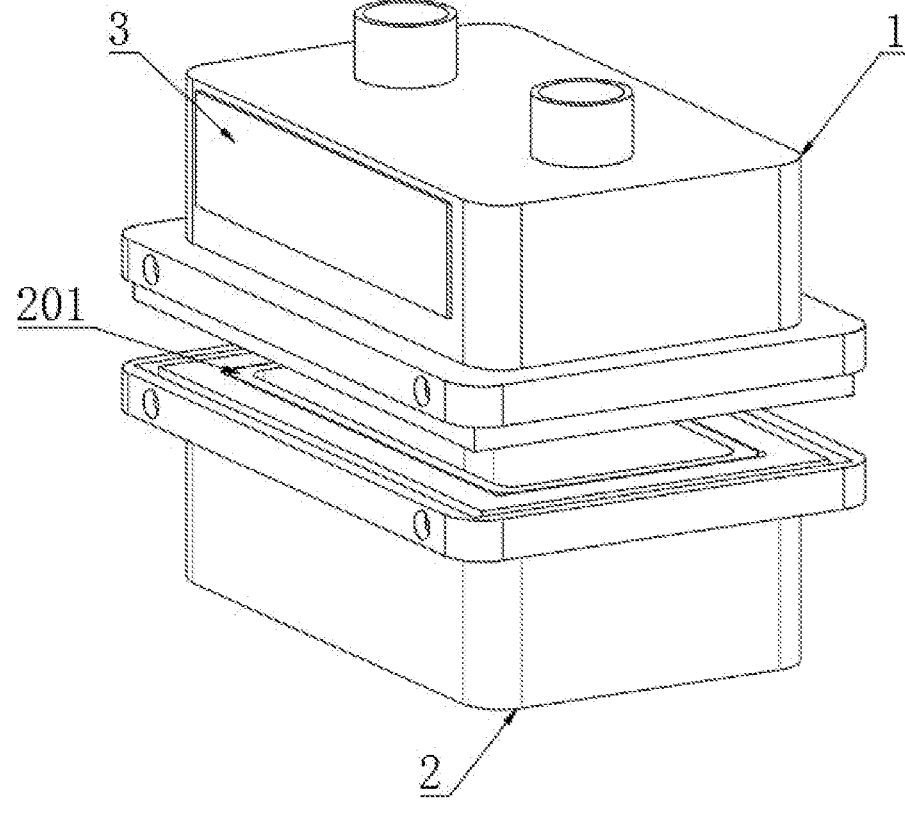
FIG. 7 is a structural diagram of a lower housing according to the present disclosure.

As shown in FIG. 6, sound insulation layer 201 is fixedly provided in each of the upper housing 1 and the lower housing 2. The sound insulation layer 201 can effectively isolate noise generated during the operation of the gas meter.

A working principle of the present disclosure is as follows. When the gas enters the gas flow channel 4, the gas is measured. In addition, when the gas enters the gas flow channel 4, the shielding layer 6 can effectively shield external signals, thereby avoiding external signal interference. The signal sensor 7 can detect external signals. When an external signal that is not completely shielded is detected, the motor 504 is started through an internal program. Then the motor 504 drives the bidirectional threaded rod 501 to rotate. As the bidirectional threaded rod 501 rotates, the two sealing elements 503 move in opposite directions until the connecting element 5031 is inserted into the connecting groove 5032. Thus, the two sealing elements 503 seal the opening at a side of the control box 5 to prevent continued flow of the gas. Meanwhile, the signal sensor 7 can send a signal to an external device to notify personnel of inspection. During inspection, the personnel can rotate and pull the a plurality of connecting bolts 104 out of the connecting holes 105. Thus, the fixing plate 103 can be removed, and the upper housing 1 can be separated from the lower housing 2 such that the personnel can inspect the internal structure. The sound insulation layer 201 inside the upper housing 1 and the lower housing 2 can effectively isolate the noise generated by the gas meter during operation.

The above described are the basic principles, main features, and advantages of the present disclosure. It should be understood by those skilled in the art that, the present disclosure is not limited by the above embodiments, and the above embodiments and the description only illustrate the principle of the present disclosure. Various changes and modifications may be made to the present disclosure without departing from the spirit and scope of the present disclosure, and such changes and modifications all fall within the claimed scope of the present disclosure. The claimed protection scope of the present disclosure is defined by the appended claims and equivalents thereof.

What is claimed is:

1. An anti-interference structure for an ultrasonic gas meter, comprising an upper housing and a lower housing, wherein a gas flow channel is fixedly provided in the upper housing; a side of the gas flow channel is fixedly provided with a control box; a side of an outer surface of the gas flow channel is fixedly provided with a shielding layer; and a side of an interior of the gas flow channel is fixedly provided with a signal sensor, wherein a first side of an interior of the control box is movably provided with a bidirectional threaded rod, and a second side of the interior of the control box is fixedly provided with a sliding rod; two sides of an outer surface of the bidirectional threaded rod are respectively movably connected to two sealing elements, and the two sealing elements are movably connected to the sliding rod; a side of an outer surface of the control box is fixedly provided with a motor; and an output end of the motor is fixedly connected to the bidirectional threaded rod.

2. The anti-interference structure for the ultrasonic gas meter according to claim 1, wherein the outer surface of the bidirectional threaded rod is provided with two opposite threaded grooves.

3. The anti-interference structure for the ultrasonic gas meter according to claim 1, wherein a side of an interior of the control box is provided with a driving groove; a bearing is fixedly provided in the driving groove; and the bidirectional threaded rod is fixedly connected to the bearing.

4. The anti-interference structure for the ultrasonic gas meter according to claim 1, wherein a side of each of the two sealing elements is fixedly provided with a sealing layer; and a side of a first sealing element of the two sealing elements is fixedly provided with a connecting element, and a side of a second sealing element of the two sealing elements is provided with a connecting groove.

5. The anti-interference structure for the ultrasonic gas meter according to claim 1, wherein the upper housing comprises a fixing plate; a bottom surface of the upper housing is fixedly provided with a fixing element; a top surface of the lower housing is provided with a fixed groove; a side of the fixing plate is movably connected to a plurality of connecting bolts; and two sides of each of the upper housing and the lower housing are respectively provided with a plurality of connecting holes.

6. The anti-interference structure for the ultrasonic gas meter according to claim 1, wherein a sound insulation layer is fixedly provided in each of the upper housing and the lower housing.

7. The anti-interference structure for the ultrasonic gas meter according to claim 1, wherein a side of an outer surface of the upper housing is fixedly provided with a display screen.

* * * * *